United States Patent [19]
Luce

[11] Patent Number: 5,608,615
[45] Date of Patent: Mar. 4, 1997

[54] ASYNCHRONOUS INTERGRID TRANSFER APPARATUS

[76] Inventor: John W. Luce, 1030 S. Sterling Ave., Tampa, Fla. 33629

[21] Appl. No.: 613,481

[22] Filed: Mar. 11, 1996

[51] Int. Cl.$^6$ .................................................. H02M 1/20
[52] U.S. Cl. ........................................................ 363/102
[58] Field of Search .................................... 363/102–105, 363/132, 137, 51; 307/38, 41, 45, 84, 87; 323/205; 318/767, 807, 808, 809; 388/930, 931, 932

[56] References Cited

U.S. PATENT DOCUMENTS

| | | | |
|---|---|---|---|
| 3,694,728 | 9/1972 | Kanngiesser et al. | 363/51 |
| 3,701,938 | 10/1972 | Chadwick | 363/51 |
| 4,019,115 | 4/1977 | Lips | 363/51 |
| 4,251,736 | 2/1981 | Coleman | 307/46 |
| 4,445,049 | 4/1984 | Steigerwald | 307/45 |
| 4,870,558 | 9/1989 | Luce | 363/87 |
| 4,922,124 | 5/1990 | Seki et al. | 307/87 |
| 4,941,079 | 7/1990 | Ooi | 363/132 |
| 4,992,721 | 2/1991 | Latos | 322/10 |
| 5,239,251 | 8/1993 | Lauw | 318/767 |
| 5,341,280 | 8/1994 | Divan et al. | 363/37 |

Primary Examiner—Matthew V. Nguyen
Assistant Examiner—Adolf Berhane
Attorney, Agent, or Firm—David Kiewit

[57] ABSTRACT

An asynchronous converter comprises a torque motor and a rotating electric machine having two sets of windings, each of the windings connected to a respective polyphase electric circuit. The two windings have the same number of magnetic poles and generate coincident rotating magnetic fields having the same direction of rotation. When a torque is applied (e.g., to the shaft of a rotor carrying one of the windings) in the same direction as that of the rotating magnetic fields, electric power is transferred from the rotor-connected circuit to the stator-connected circuit. When the direction of the torque is reversed, the direction of the power transfer is also reversed. The two polyphase circuits may differ in voltage, in frequency and in number of electrical phases, but it is expected that in most cases the number of phases will be equal to three for both circuits and the operating frequencies of the two circuits will differ by no more than a few percent.

24 Claims, 2 Drawing Sheets

ASYNCHRONOUS INTERGRID TRANSFER APPARATUS

BACKGROUND OF THE INVENTION

1. Field of the Invention

The invention provides means for transferring power between two electrical utility grids.

2. Description of Related Art

It is an established practice in the generation, transmission and distribution of electric power to interconnect a plurality of polyphase power sources into a "grid" comprising a plurality of sources synchronized to have identical frequency, number of electrical phases, and electrical phase angles. Grids may be very large and may include multiple utility systems as well as a large number of co-generation sites. Within the United States there are only four such grids.

It is also known to transfer electric power from one grid to another. This is usually done by a cumbersome process of converting AC electric power at a first frequency and a first phase from the supplying grid into DC power, which is then transferred to the second grid and inverted to AC power at a second frequency and second phase. It is customary to carry out this process using well known solid state devices, such as transistors or rectifiers, in the rectification and inversion steps. The use of semiconductor devices in the prior art of intergrid transfer leads to the generation of substantial harmonic current and voltage distortion. It is conventional to overcome this problem by providing three filters (one on the DC link, and one on each AC end of the inter-grid transfer apparatus), an approach that can increase the amount of land needed for the intergrid transfer station by nearly 50%.

Various means of avoiding harmonic distortion in AC-DC electrical power conversion have been suggested. The inventor's teachings in this area have included his U.S. Pat. No. 4,870,558, and his pending U.S. patent application Ser. No. 08/287,489, the disclosures of which are herein incorporated by reference.

SUMMARY OF THE INVENTION

An asynchronous converter of the invention comprises: a) a rotating electric machine having a first set of windings connected to a first polyphase electric circuit and a second set of windings connected to a second polyphase electric circuit; and b) a torque-applying means acting to apply torque between the two windings. The two windings have the same number of magnetic poles and generate coincident rotating magnetic fields having the same direction of rotation. When a torque is applied (e.g., to a rotor shaft) in the same direction as that of the rotating magnetic fields, electric power is transferred from the rotor-connected circuit to the stator-connected circuit. When the direction of the torque is reversed, the direction of the power transfer is also reversed. The two polyphase circuits may differ in voltage, in frequency and in number of electrical phases, but it is expected that in most cases the number of phases will be equal to three for both circuits and the operating frequencies of the two circuits will differ by no more than a few percent.

It is an object of the invention to provide apparatus for transferring poly-phase electric power from a first grid having a first frequency and first phase to a second grid having a second frequency and second phase without thereby creating harmonic current distortion on either grid.

It is also an object of the invention to provide apparatus for transferring poly-phase electric power from a first grid to a second grid without creating harmonic voltage distortion.

It is an additional object of the invention to provide means for compensating for phase-to-phase voltage imbalances when transferring power from one grid to another.

It is yet a further object of the invention to provide means for managing weak link instabilities occurring in power transfers between portions of a utility grid.

It is also an object of the invention to provide means of adjusting power factors in transferring power from one grid to another.

It is yet a further object of the invention to improve the efficiency of inter-grid power conversion.

It is also an object of the invention to provide an inter-grid power transfer system that is smaller and more economical than prior art systems.

It is yet a further specific object of the invention to reduce the installed cost of inter-grid power conversion apparatus by eliminating the cost of land used in prior art equipment for siting filtering equipment and the like used to remediate harmonic distortion created by prior art conversion methods.

DETAILED DESCRIPTION

Figure 1:
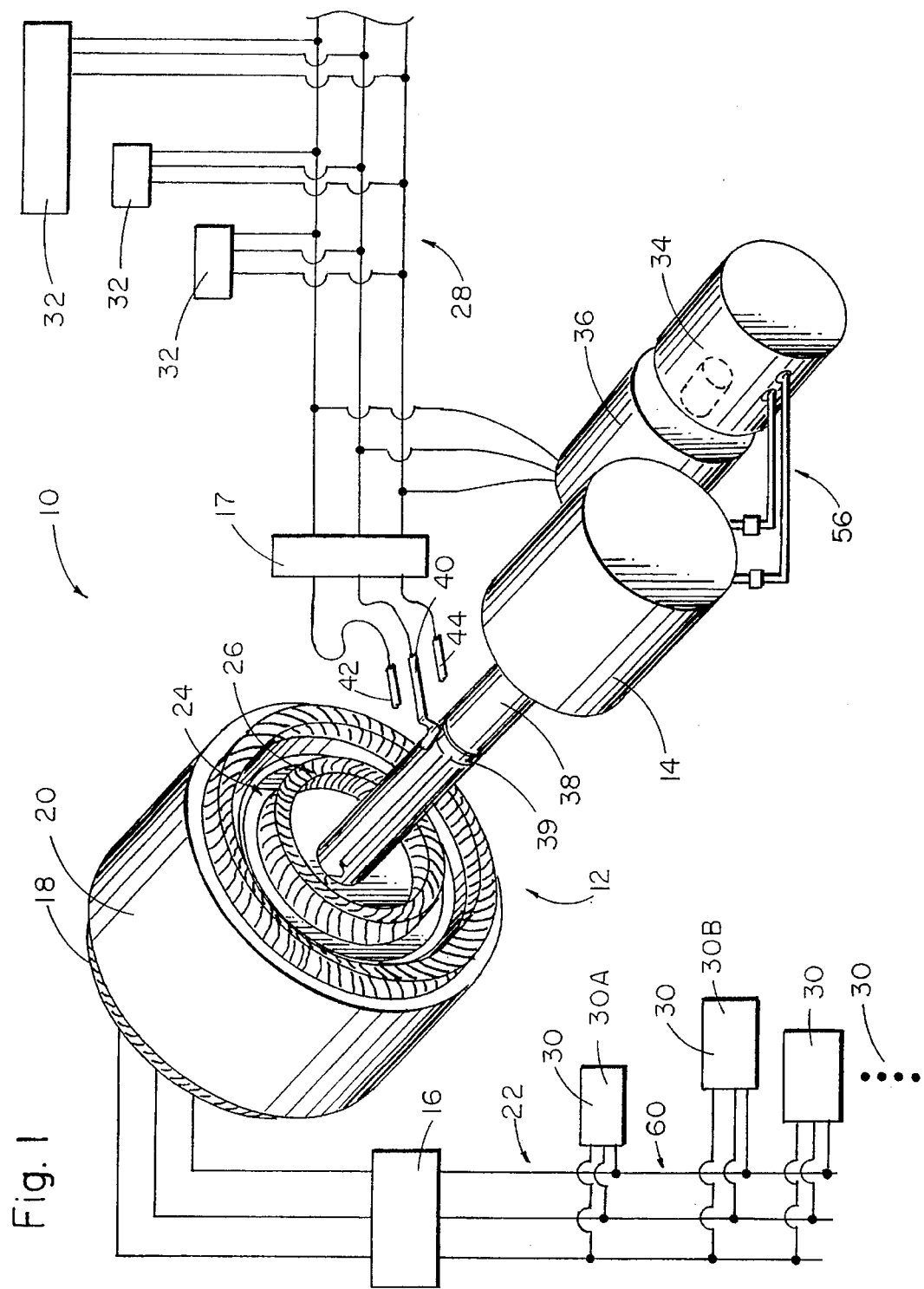
FIG. 1 of the drawing is a schematic perspective view of a three-phase embodiment of the apparatus of the invention. Two of the three slip rings have been omitted from FIG. 1 in the interest of clarity of presentation.
Figure 2:
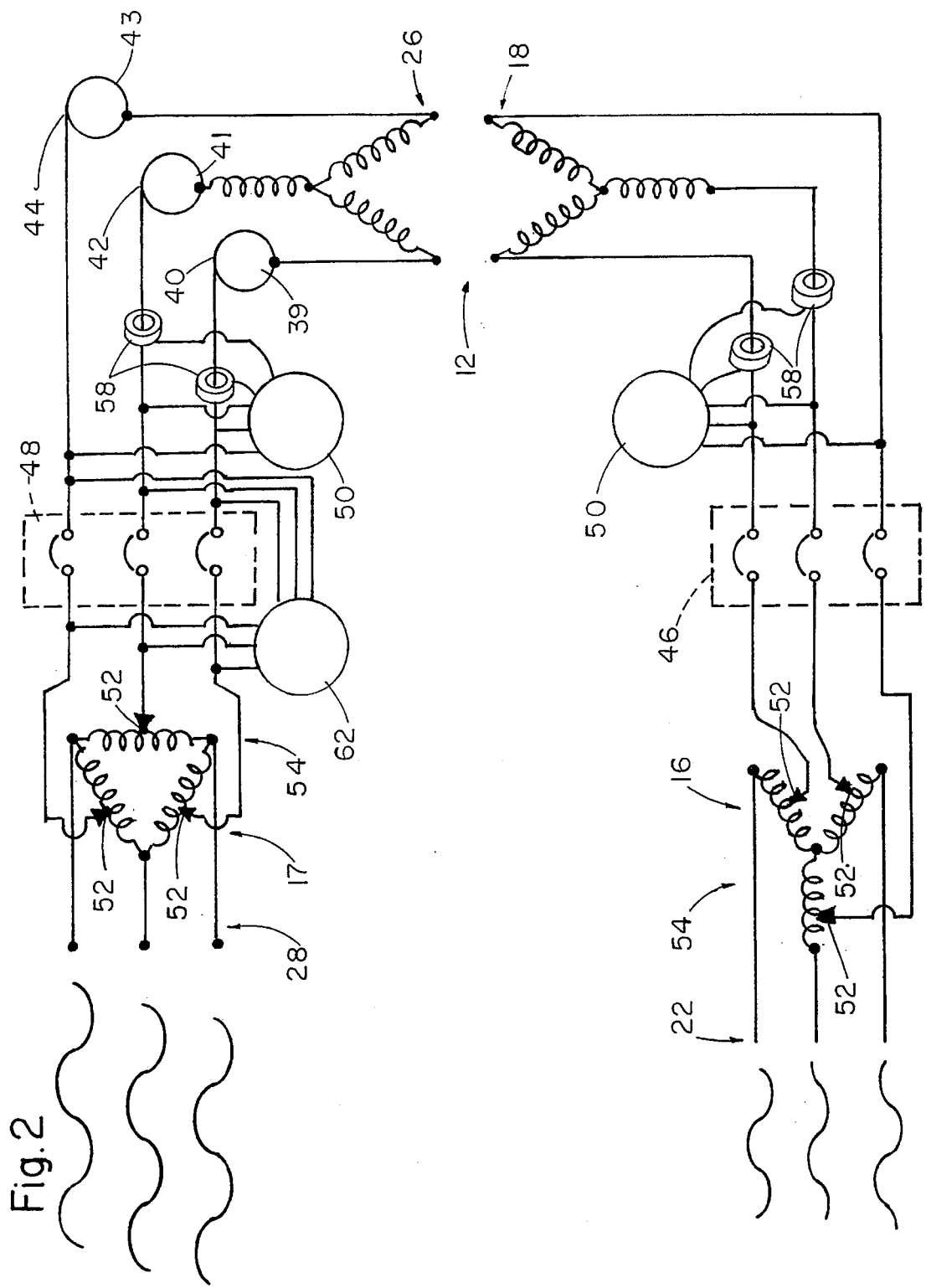
FIG. 2 of the drawing is a schematic electrical circuit diagram of a three-phase version of the apparatus of the invention.

Turning initially to FIG. 1 of the drawing, one finds a preferred embodiment of the asynchronous converter 10 of the invention comprising a rotating electrical machine 12, a torque motor 14, and voltage adjusting means 16, 17. In a preferred embodiment the rotating machine 12 is very much like a wound rotor induction motor (also known as an AC slip ring motor) in which the rotor slots, windings, slip-rings and brushes are designed to carry full power at all times. The stator windings 18 on the stator 20 of the rotating machine 12 are wound for the voltage and phasing of the first electric grid 22, while the rotor 24 has rotor windings 26 wound for the voltage and phasing of the second grid 28. Both the rotor 24 and stator 20 are wound for the same number of magnetic poles. Because the apparatus of the invention may be used to transfer power in either of the two possible directions, both the rotor and stator windings are preferably designed to have the same power rating, which is not commonly the situation for an induction motor.

Although the rotating machine 12 is depicted in the most common configuration in which rotor windings 26 are disposed about a shaft 38 rotatable within a fixedly mounted stator 20, it will be recognized by those skilled in the art that other known configurations could be employed. For example, a rotating machine 12 could be configured with two sets of polyphase coils facing each other and having coaxially coincident magnetic fields, where one of the sets of coils can rotate relative to the other. Although the use of a facing coil configuration is uncommon in the generation and use of poly-phase electric power, analogous single-phase devices have been used. For example, magnetos for internal combustion engines have been made with a stationary circular array of coils, mounted on the engine block, facing a rotating array of permanent magnets mounted on the flywheel (an arrangement employed on the Model T Ford automobile some eighty years ago). This facing coil configuration could have an advantage in that the two sets of coils could easily be made to have the same size and shape and thereby to provide identical power ratings.

It is also well known to make a rotating machine 12 having two sets of coaxial polyphase coils in which the outer of the two sets of coils rotates while the inner set is held stationary (i.e., a configuration similar to an induction motor in which the apparent stator rotates about a fixed apparent rotor). It is additionally known (e.g., in the art of electrically propelled torpedoes) to add a second set of bearings and brushes in order to configure a rotating machine 12 similar to a motor in which both the rotor 24 and stator 20 rotate in a fixed frame of reference (in the torpedo example each of two counter-rotating propellers is driven by one of the rotating sets of coils). What is important to the invention is that the rotating electrical machine 12 comprises two sets of polyphase windings having coincident magnetic fields, and that one of the windings is rotatable relative to the other in either of the two possible senses of rotation about a common axis.

The rotor windings 26 may be connected to the rotor grid 28 via the illustrated combination of a voltage adjusting means 17, brushes 40, 42, 44, and slip rings 39, 41, 43. It will be understood by those skilled in the art that other known means of connecting a grid 28 to the rotor windings 26 may also be employed. Such means include, inter alia, a revolving transformer. As will become clearer in the ensuing disclosure, the rotor 24 of the asynchronous converter 10 may be nearly stationary for extended intervals or may rotate very slowly, hence, the brushes 40, 42, 44 may have to be specially designed to avoid localized erosion of the slip rings 39, 41, 43 which would impede subsequent motion of the rotor 24. Such special brush designs may encompass mounting the brushes 40, 42, 44 in rotatable collars (not shown) and oscillating them back and forth over a restricted angular range. Alternately, one could employ a brush collar (not shown) disposed intermediate the slip ring and an external contact, the brush collar having inward and outward facing brushes and a separate means of rotation so that both sets of brushes would move across their respective contacts quickly enough as to avoid local erosion.

The apparatus 10 of the invention is expected to be primarily used as a means of transferring electric power between two three-phase grids 22, 28, both operating nominally at the same frequency (e.g., fifty or sixty Hertz). It should be noted that the apparatus 10 will operate if the grids 22, 28 have a greater disparity in frequency (although in this case the power expended in the hydraulic torque motor 14 portion of the apparatus will be significantly greater, as will be subsequently described herein). The asynchronous converter 10 will also operate if the number of phases on the stator 22 and rotor 28 grids differ.

A torque motor 14 connected to the shaft 38 of the rotor 24 is used to supply torque continuously at typically low rotational speeds. In this application the torque motor 14 must supply a torque between the windings 18, 26 in either of the two possible rotational directions, and must either drive or be driven. This preferred arrangement, in which the torque-applying means is also capable of absorbing a torque applied to it, is commonly called four quadrant operation. A variety of different motor types, embracing hydraulic, pneumatic, and electric motors may be considered for this application.

A converter 10 of the invention may be constructed with any orientation of the rotary axis—e.g., as shown in FIG. 1, with the slip rings 39, 41, 43 and brushes 40, 42, 44 disposed intermediate the rotating machine 12 and the torque motor 14. It will be understood that any of a wide variety of different placements of these elements could be chosen—e.g., one could consider placing the slip rings 39, 41, 43 and brushes 40, 42, 44 on the opposite end of the shaft from the hydraulic motor 14. As a specific example, consider a converter with a vertical axis of rotation, and with the torque motor 14, rotor 24 and stator 20 immersed in an oil bath (not shown) as is common in transformer art, but not commonly done in rotating machinery because of viscous drag losses. (It is expected that in most of its uses, the apparatus of the invention will operate with very low rotational speeds, so drag losses are of little concern). In the exemplar design, the slip rings 39, 41, 43, and brushes 40, 42, 44 would be on the upper end of the shaft 38 (i.e., would be on the opposite side of the rotating machine 12 from the torque motor 14) so as to be above the level of the oil. It will be understood to those skilled in the art of power generating and conversion equipment that other liquid or gaseous cooling media could be used in either forced or convectively circulated arrangements.

Voltage adjusting means 16, 17 are used to adjust the power factor. As is known in the art, such means may comprise tap transformers 16, 17, preferably set up on both sides of the rotating machine 12.

Other known equipment used in the system of the invention comprises contactors 46, 48 connecting or disconnecting one side of the rotating machine 12 from its respective power grid 22, 28; power factor indication instruments 50; and a synchroscope 62. The power factor meters 50 are conventionally connected to the grids 22, 28 with voltage connections to each of the phases and with current connections to at least two of the three phases made by means of current transformers 58.

when the asynchronous converter 10 is connected between two poly-phase grids 22, 28, currents in the stator and rotor windings 18, 26 induce coincident rotating magnetic fields in the magnetic circuit of the machine 12. In the asynchronous converter 10 of the invention, the stator windings 18 and rotor windings 26 are connected to the phase conductors of the power grids 22, 28 so that each winding 18, 26, if acting alone, would generate a rotating magnetic field rotating in the same predetermined direction. Each of these rotating magnetic fields would be substantially constant in angular velocity.

If the torque motor 14 does not exert a torque on the shaft 38, the rotor and stator magnetic fields will interact to produce a torque bringing the two fields into alignment. If the two grids 22, 28 have the same frequency, the rotor 24 will initially move until the fields are aligned. Thereafter, the rotor 24 will remain stationary, the fields will rotate at synchronous speed and the flux density will be determined by the winding-turns, voltages and frequency, as is well known in the art. If, on the other hand, the two grids 22, 28 are operating at slightly different frequencies, the rotor 24 will rotate at a speed proportional to the frequency difference and to the number of poles for which the rotating machine 12 is wound. If the grid 22 connected to the stator windings 18 has the higher of the two frequencies, the rotor 24 will turn in the direction of the rotating magnetic field. Conversely, if the grid 22 of the stator windings 18 has the lower frequency, the rotor 24 will turn in the opposite rotational direction. It will be understood to those skilled in the art that although the grids 22, 28 are shown as conventional three-phase grids, the asynchronous converter 10 of the invention would work with any number of phases greater than one.

Power is transferred between grids by applying torque to the shaft 38 of the asynchronous converter 10. If torque is applied in the same direction as that of the rotating magnetic field, power is transferred from the grid 28 connected to the rotor windings 26 to the grid 22 connected to the stator windings 18. Conversely, if the applied torque is directed oppositely to the rotating magnetic field, power is transferred from the stator grid 22 to the rotor grid 28. The power transferred is the arithmetic product of the torque and the rotational speed of the rotating magnetic field.

If the frequencies of the two grids 22, 28 differ, the applied torque may act either in the same sense or in an opposing sense to the rotational direction of the shaft 38. Under some operating conditions the torque motor 14 may be overhauled by the rotating machine 12 and should therefore preferably be capable of four quadrant operation. When the sending grid has the lower frequency, the torque motor 14 (which may be powered from either grid) provides some of the transferred power. If, on the other hand, the sending grid has the higher frequency, the torque motor 14 is overhauled and the excess power is dissipated as heat.

The hydraulic power dissipated increases with the disparity in frequency between the two grids 22, 28. When coupling two nominally sixty Hertz grids, one expects to encounter an average disparity of less than 0.1 Hz. Fault conditions, however, can raise this disparity with a concomitant drastic increase in power dissipation. Because faults are mostly of very short duration, the thermal mass and mechanical inertia of the asynchronous converter 10 can be chosen to be high enough to provide an adequate margin of operating safety without having to operate disconnect means 46, 48 to remove the converter 10 from service. The rare cases of extended duration faults can be dealt with either by disconnecting the apparatus 10 from the grids 22, 28 or by designing the converter 10 to operate under these worst case conditions. Designing the converter 10 to operate under worst-case frequency mis-match conditions is likely to be self-defeating both because of the increased size and cost of the hydraulic system 56, and because of the undesirability of operating a hydraulic system 56 for most of the time at a small fraction of its rated output.

The power transfer described supra occurs regardless of the relative voltages of the two grids 22, 28, but the power factor presented to each grid is a function of those voltages. It is therefore preferred to employ voltage adjusting means 16, 17 to adjust the power factors on the two grids 22, 28 to a desired value, which will commonly be close to unity. Consequently, a preferred embodiment of the invention comprises power factor indicating instruments 50 connected to both grids 22, 28. An imbalance in the phase voltages of either grid 22, 28 will produce a negative sequence third harmonic of the difference frequency that will result in a power transfer fluctuation and increased losses in the asynchronous converter 10. As is known in the art, this problem can be addressed by appropriate adjustment of individual phase taps 52 on the tapped transformers 54 comprising preferred voltage adjustment means 16, 17.

An asynchronous converter 10 using a hydraulic motor 14 as a torque-applying means could be started from rest by pressurizing the hydraulic system 56 associated with the torque motor 14 and the hydrostatic bearings (not shown) of the rotating machine 12. The stator windings 18 would then be connected to its power grid 22. The torque motor 14 would be operated to slowly turn the rotor 24 until a synchroscope 62, connected to the rotor windings 26 and to the other grid 28, indicated that each rotor voltage was in phase with the corresponding phase voltage on its grid 28. The rotor windings 26 would then be connected to the grid 28 by an appropriate contactor 48 and the torque motor 14 would be powered to supply torque in an appropriate direction so as to transfer power in the desired direction. Finally, taps 54 would be adjusted to bring the power factors to a desired level.

In an exemplary embodiment of the invention, designed for the transfer of 100MW of electric power between two grids 22, 28, each comprising one or more polyphase electric power sources 30, 32, the stator 20 and rotor 24 could be wound for three phases, eight poles, and 13.8 kV. The torquing function could be supplied by a pair of low speed, high torque hydraulic motors 14 powered by a pump 34. The electric motor 36 powering the pump 34 could be supplied from one or the other of the grids 22, 28. It will be understood that the torque motor 14 may be connected directly to the shaft 38, or may be connected through other known connection means such as an overhaulable gear drive (e.g., a 30:1 reduction gear) compatible with the four quadrant operation of the motor 14 (e.g., a worm gear speed reduction means, which would not allow the rotating machine 12 to overhaul the torque motor 14, would not be compatible with four quadrant operation).

If one of the two exemplar grids 22, 28 is operating at 60 Hz and the other is operating at 59.94 Hz, the rotational speed of the shaft 38 would be 0.9 RPM and the hydraulic motor speeds (at a 30:1 reduction) would be 27 RPM. At full load the converter shaft 38 torque would be 782,264 foot-pounds, requiring a total hydraulic power of 134 HP, which would be either taken from the grid 28 powering the pump 34 or, if the torque motor 14 is being overhauled by the rotating machine 12, would be dissipated as heat in a relieving regulator (not shown). It may be noted that in this example the dissipation represents a power loss, under load conditions, of 0.1%.

It may be noted that the asynchronous converter 10 of the invention may also be used within an electric grid as a means of managing instabilities in weak links. In conventional utility practice a grid 22 may comprise two power generating stations 30A, 30B connected by a "weak link" powerline 60 capable of regularly carrying a fraction of the power output from either of the generating stations 30A, 30B. That is, the grid 22 commonly comprises a plurality of local generating stations 30, each providing most of its output power to a variety of local loads (not shown), where the grid functions to relieve imbalances between the local generators 30 and local loads. These imbalances, which commonly are a small fraction of a given generating station's capacity, are handled by the weak link 60, which can be overloaded and become unstable.

An asynchronous converter 10 connected within a weak link 60 between two generating stations 30A, 30B could be used to manage weak link instabilities. In the normal operation of such a system—i.e., when the weak link 60 was operating in a normal stable mode—the hydraulic motor 14 would require substantially no power, as the two generating stations 30A, 30B linked by the weak link 60 are synchronized.

Although the present invention has been described with respect to an exemplar preferred embodiment, many modifications and alterations can be made without departing from the invention. Accordingly, it is intended that all such modifications and alterations be considered as within the spirit and scope of the invention as defined in the attached claims.

What is claimed is:

1. Apparatus transferring electric power between two polyphase electric circuits, the apparatus comprising a rotating machine and a torque motor, the rotating machine comprising a first set of windings having a predetermined number of poles, the first set of windings electrically connected to a first of the circuits and generating a first rotating magnetic field having a predetermined direction of rotation about an axis, and a second set of windings having the predetermined number of poles, the second set of windings electrically connected to the second circuit and generating a second rotating magnetic field having the predetermined direction of rotation; and connection means operatively connecting the torque motor intermediate the two sets of windings so as to apply a torque therebetween, the torque applied to the second set of windings having the predetermined rotational direction when electric power is transferred from the first circuit to the second circuit, the torque oppositely directed when electric power is transferred from the second circuit to the first circuit.

2. The apparatus of claim 1 wherein the first set of windings comprises stator windings wound on a stationary stator, the second set of windings comprises rotor windings wound on a rotor having a shaft and wherein the connection means comprises means coupling the torque motor to the shaft.

3. The apparatus of claim 1 wherein the first and the second sets of windings have equal power ratings.

4. The apparatus of claim 1 wherein the torque motor is capable of four quadrant operation.

5. Apparatus of claim 1 wherein the torque motor is powered from one of the two circuits.

6. Apparatus of claim 1 wherein the torque motor is a hydraulic motor powered by a hydraulic pump driven by an electric motor drawing power from one of the two circuits.

7. Apparatus of claim 1 further comprising voltage adjusting means attached intermediate one of the two circuits and one of the windings connected thereto.

8. Apparatus of claim 7 wherein the voltage adjusting means comprises a tapped transformer.

9. Apparatus transferring electric power between two polyphase electric circuits, the apparatus comprising a rotating machine and a torque motor, the rotating machine comprising a first set of windings having a predetermined number of poles, the first set of windings electrically connected to a first of the circuits and generating a first rotating magnetic field having a predetermined direction of rotation about an axis, and a second set of windings having the predetermined number of poles, the second set of windings electrically connected to the second circuit and generating a second rotating magnetic field having the predetermined direction of rotation; and connection means operatively connecting the torque motor intermediate the two sets of windings so as to apply a torque therebetween, the magnitude of the applied torque controlling the magnitude of the power transferred.

10. The apparatus of claim 9 wherein the first set of windings comprises stator windings wound on a stationary stator, the second set of windings comprises rotor windings wound on a rotor having a shaft and wherein the torque motor is connected to the shaft.

11. The apparatus of claim 9 wherein both the first and the second sets of windings have equal power ratings.

12. The apparatus of claim 9 wherein the torque motor is capable of four quadrant operation.

13. The apparatus of claim 9 wherein the torque motor is powered from one of the two circuits.

14. The apparatus of claim 9 wherein the torque motor is a hydraulic motor powered by a hydraulic pump driven by an electric motor drawing power from one of the two circuits.

15. The apparatus of claim 9 further comprising voltage adjusting means attached intermediate one of the two circuits and one of the windings connected thereto.

16. The apparatus of claim 15 wherein the voltage adjusting means comprises a tapped transformer.

17. A method of transferring electric power between two polyphase electric grids, the method comprising the steps of:

a) connecting a first of the two grids to a first set of polyphase windings having a first predetermined number of poles, thereby producing a first rotating magnetic field having a first predetermined direction of rotation about an axis, b) connecting the second grid to a second set of polyphase windings rotatable with respect to the first set of windings, the second set of windings having the predetermined number of poles, thereby producing a second rotating magnetic field coincident with the first magnetic field and rotating in the predetermined direction, c) applying a torque between the two sets of windings, the torque applied to the first set of windings in the predetermined rotational direction to transfer power from the second grid to the first grid, the torque applied in the opposite rotational direction to transfer power from the first grid to the second grid.

18. The method of claim 17 further comprising steps and a2) intermediate step a) and step b) of a1) connecting a synchroscope intermediate the second grid and the second set of windings, and a2) rotating the second set of windings with respect to the first set of windings until each voltage on the second set of windings is in phase with the corresponding voltage on the second grid.

19. An electric power transfer system comprising a first polyphase electric power grid, a second polyphase electric power grid, and an asynchronous converter transferring electric power from one of the two grids to the other, the converter comprising a stator having a set of stator windings electrically connected to the first grid, the stator windings generating a first rotating magnetic field having a predetermined direction of rotation about an axis, a rotor comprising a set of rotor windings disposed about a shaft rotating about the axis, the rotor windings electrically connected to the second grid, the rotor windings generating a second rotating magnetic field rotating in the predetermined direction, and a torque motor applying a torque to the shaft.

20. The system of claim 19 wherein the torque motor is capable of four quadrant operation.

21. The system of claim 19 wherein the torque motor is powered from one of the two grids.

22. Apparatus of claim 19 wherein the torque motor is a hydraulic motor powered by a hydraulic pump driven by an electric motor drawing power from one of the grids.

23. Apparatus of claim 19 further comprising voltage adjusting means attached intermediate one of the two grids and one of the windings connected thereto.

24. Apparatus of claim 23 wherein the voltage adjusting means comprises a tapped transformer.

* * * * *

UNITED STATES PATENT AND TRADEMARK OFFICE
CERTIFICATE OF CORRECTION

PATENT NO. : 5,608,615
DATED : March 4, 1997
INVENTOR(S) : John W. Luce

It is certified that error appears in the above-indentified patent and that said Letters Patent is hereby corrected as shown below:

Column 8, lines 27 and 28 of the published patent read: "18. The method of claim 17 further comprising steps and a2) intermediate step a) and step b) of"

This text should corrected by inserting -- a1 -- after "18. The method of claim 17 further comprising steps" and before "and a2) intermediate step a) and step b) of".

Signed and Sealed this

Third Day of June, 1997

Attest:

BRUCE LEHMAN

Attesting Officer

Commissioner of Patents and Trademarks

Adverse Decision In Interference

Patent No. 5,608,615, John W. Luce, ASYNCHRONOUS INTERGRID TRANSFER APPARATUS, Interference No. 104,162, final judgment adverse to the patentee rendered December 7, 2000, as to claims 1-24.

*(Official Gazette April 10, 2001)*